United States Patent [19]

Matsui et al.

[11] Patent Number: 4,659,744
[45] Date of Patent: Apr. 21, 1987

[54] FLUOROCARBON ANION EXCHANGERS AND PROCESSES FOR THEIR PREPARATION

[75] Inventors: Kiyohide Matsui, Sagamihara; Yoshiyuki Kikuchi, Tokyo; Tamejiro Hiyama, Sagamihara; Etsuko Tobita, Urawa; Kiyosi Kondo, Yamato; Akira Akimoto, Hohfu; Toru Seita; Hiroyuki Watanabe, both of Shin-nanyo, all of Japan

[73] Assignees: Toyo Soda Manufacturing Co., Ltd., Shin-nanyo; Sagami Chemical Research Center, Tokyo, both of Japan

[21] Appl. No.: 624,029

[22] Filed: Jun. 25, 1984

[30] Foreign Application Priority Data

Dec. 28, 1982 [JP] Japan ................. 57-227443

[51] Int. Cl.[4] .................. B01J 41/14; C08F 8/02
[52] U.S. Cl. .................... 521/32; 525/326.2; 525/326.4
[58] Field of Search ............ 526/243; 521/32, 25, 521/31, 38

[56] References Cited

U.S. PATENT DOCUMENTS

| | | | |
|---|---|---|---|
| 2,801,224 | 7/1957 | Greer | 521/32 |
| 3,969,285 | 7/1976 | Grot | 526/243 |
| 4,081,349 | 3/1978 | Hora et al. | 521/32 |
| 4,082,701 | 4/1978 | Fries et al. | 521/32 |
| 4,085,071 | 4/1978 | Resnick et al. | 521/32 |
| 4,093,568 | 6/1978 | Seko et al. | 521/32 |

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

A fluorocarbon anion exchanger which is composed of a fluorocarbon polymer comprising a perfluorocarbon main chain and a pendant chain attached to the main chain, characterized in that the pendant chain has a terminal group represented by the formula:

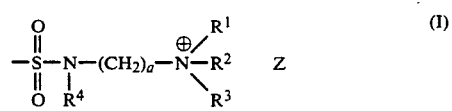

(I)

5 Claims, No Drawings

FLUOROCARBON ANION EXCHANGERS AND PROCESSES FOR THEIR PREPARATION

The present invention relates to novel highly durable anion exchangers having quaternary ammonium group(s).

Anion exchangers, particularly membrane-type anion exchangers, are practically used in the fields of e.g. electrodialysis, diffusion dialysis and various electric cells.

For such membrane-type ion exchangers, it has been common to employ a copolymer or a polymer mixture obtainable by a various combination of hydrocarbon monomers, to which anion exchange groups have been introduced by a polymer reaction.

However, such conventional anion exchangers are likely to be materially deteriorated when subjectd to severe conditions, for instance, when used in the presence of e.g. chlorine or a strong base, or when subjected to the repetition of swelling and contruction. Therefore, it is desired to develop an anion exchanger which is durable even under such severe conditions.

As a membrane-type anion exchanger developed to improve the durability, there has been known an exchanger prepared by mixing a fluorinated polymer such as poly(tetrafluoroethylene) and an inorganic anion exchanger such as a hydrate of zirconium oxide, and press-molding the mixture (Japanese Unexamined Patent Publication No. 35079/1975). However, the ion exchange capacity of an inorganic anion exchanger composed of such an amphoteric metal oxide is usually largely dependent on the hydrogen ion concentration in the environment in which it is used. In some cases, an inversion of the ion exchange ability will take place. For instance, the hydrate of zirconium oxide acts as an anion exchanger at a pH of 6 or less, but it acts as a cation exchanger at a pH greater than 6. Further, it exhibits no substantial ion exchange ability under a neutral condition. Thus, the condition under which the membrane-type anion exchanger comprising such an ion exchanger may be used, is substantially restricted.

Further, it is also known to obtain a durable membrane by fluorinating the surface of a hydrocarbon anion exchange membrane (Japanese Unexamined Patent Publication No. 4489/1977). However, according to this method, it is usually difficult to accomplish adequate fluorination, and it is therby hardly possible to obtain an anion exchange membrane having adequate properties required for practical industrial purposes.

In view of the superior durability of the fluorinated polymer, the present inventors have conducted extensive researches to develop an anion exchanger using the fluorinated polymer as the base material, and have invented an anion exchanger having superior durability and a process for its preparation.

Namely, the present invention provides a fluorocarbon anion exchanger which is composed of a quaternary ammonium type polymer comprising a perfluorocarbon main chain and a pendant chain attached to the main chain, characterized in that the pendant chain has a quaternary ammonium type terminal group represented by the formula:

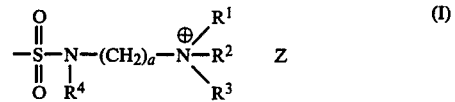

where $R^1$ is a lower alkyl group, an aromatic group or an alkyl group containing quaternary ammonium group(s), $R^2$ is a lower alkyl group, an aromatic group or a hydroxy-lower alkyl group, or $R^1$ and $R^2$ together form a tetramethylene or pentamethylene group, $R^3$ is a lower alkyl group, $R^4$ is a hydrogen atom, a lower alkyl group or an alkyl group containing quaternary ammonium group(s), a is an integer of 2 to 5, and Z is a counter ion for the quaternary ammonium ion.

The quaternary ammonium type polymer which composes the fluorocarbon anion exchanger can be prepared by a process which comprises reacting a sulfonamide group-containing fluorocarbon polymer comprising a perfluorocarbon main chain and a pendant chain attached to the main chain and having a terminal group represented by the formula:

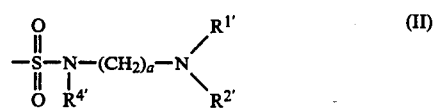

where $R^{1'}$ is a hydrogen atom, a lower alkyl group, an aromatic group or an alkyl group containing amino group(s), $R^{2'}$ is a hydrogen atom, a lower alkyl group, an aromatic group or a hydroxy-lower alkyl group, or $R^{1'}$ and $R^{2'}$ together form a tetramethylene or pentamethylene group, $R^{4'}$ is a hydrogen atom, a lower alkyl group or an alkyl group containing amino group(s), a is an integer of 2 to 5, with an alkylating agent to convert the terminal group of the formula II to the terminal group of the formula I.

The sulfonamide group-containing fluorocarbon polymer having terminal groups of the formula II can be prepared by a process which comprises reacting a fluorocarbon polymer comprising a perfluorocarbon main chain and having a fluorosulfonyl terminal group with an amine represented by the formula:

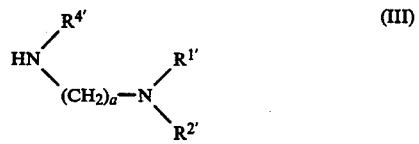

where $R^{1'}$, $R^{2'}$ $R^{4'}$ and a are as defined above, to convert the fluorosulfonyl terminal group to the terminal group of the formula II.

In this specification, the pendant chain is meant for a substituted or unsubstituted alkyl group, a perfluoro alkyl group or an aromatic group, which is attached to a main chain of a perfluorocarbon polymer. A hetero atom or an organic ring may be present between the carbon-carbon bond of the pendant chain. An alkyl group containing quaternary ammonium group(s) is meant for an alkyl group which contains not less than one, preferably from one to five nitrogen atoms whose all chemical bonds are made betewen hydrogen atom(s) or carbon atom(s) and from one to all of the nitrogen atom may be quaternized. As the concrete examples, the following structures can be illustrated:

$$-CH_2CH_2\overset{\oplus}{N}Me_3Cl^{\ominus}, \quad -CH_2CH_2CH_2\overset{\oplus}{N}Me_3Cl^{\ominus},$$

$$-CH_2CH_2CH_2\overset{\oplus}{N}Me_2EtBr^{\ominus}, \quad -CH_2CH_2\underset{H}{N}CH_2CH_2\overset{\oplus}{N}Me_3{}^{\ominus}OTs,$$

$$-CH_2CH_2\underset{Me_2}{\overset{\oplus}{N}}CH_2CH_2CH_2\underset{Et}{\overset{\oplus}{N}}Me_2 2Cl^{\ominus},$$

$$+CH_2)_{\overline{4}}\underset{H}{N}-CH_2CH_2\underset{Me_2}{\overset{\oplus}{N}}-Bu^nOAc^{\ominus},$$

$$-CH_2CH_2\underset{Me_2}{\overset{\oplus}{N}}CH_2CH_2\underset{H}{N}CH_2CH_2\overset{\oplus}{N}Me_3 SO_4{}^{2\ominus},$$

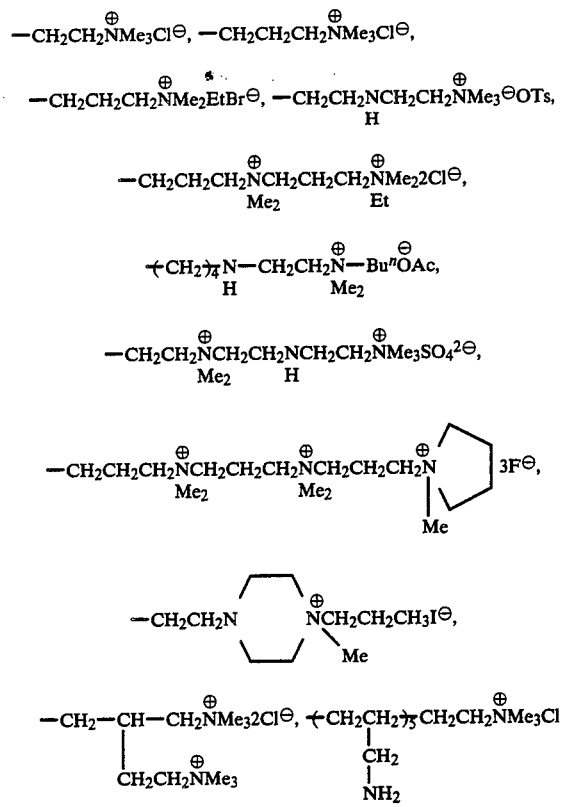

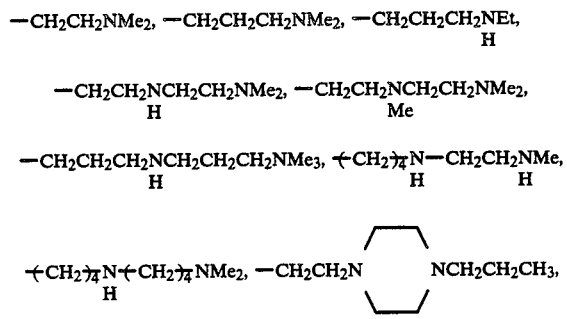

An alkyl group containing amino group(s) is meant for an alkyl group which contains not less than one, preferably from one to five amine nitrogen atoms in its alkyl chain. The following structures can be illustrated as the concrete examples:

$$-CH_2CH_2NMe_2, \quad -CH_2CH_2CH_2NMe_2, \quad -CH_2CH_2CH_2\underset{H}{N}Et,$$

$$-CH_2CH_2\underset{H}{N}CH_2CH_2NMe_2, \quad -CH_2CH_2\underset{Me}{N}CH_2CH_2NMe_2,$$

$$-CH_2CH_2CH_2\underset{H}{N}CH_2CH_2CH_2NMe_3, \quad +CH_2)_{\overline{4}}\underset{H}{N}-CH_2CH_2\underset{H}{N}Me,$$

$$+CH_2)_{\overline{4}}\underset{H}{N}+CH_2)_{\overline{4}}NMe_2, \quad -CH_2CH_2N\bigg\langle\underset{\phantom{X}}{\phantom{X}}\bigg\rangle NCH_2CH_2CH_3,$$

$$-CH_2CH_2\underset{H}{N}CH_2CH_2\underset{H}{N}CH_2CH_2\underset{H}{N}Me, \quad -CH_2CH_2CH_2NMe_2,$$

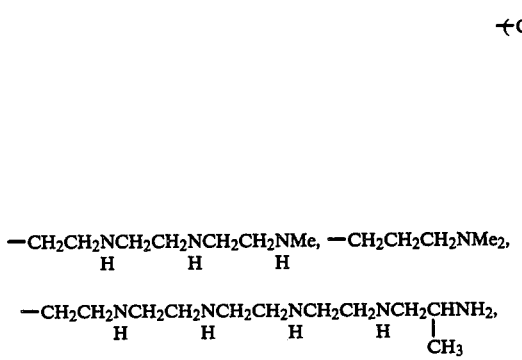

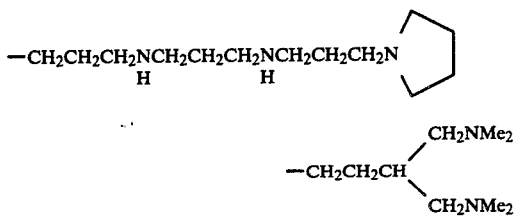

Now, the present invention will be described in detail with reference to the preferred embodiments.

In a typical quaternary ammonium type anion exchanger of the present invention, the pendant chains have a structure represented by the formula:

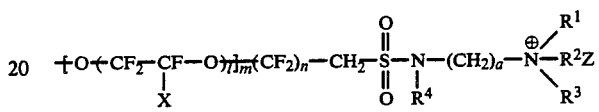

where X is a fluorine atom, a chlorine atom or a $-CF_3$ group, l is an integer of 0 to 5, m is 0 or 1, n is an integer of 1 to 5, and, Q is as defined above. The integers l, m and n may be the same or different among the pendant groups. Namely, the respective pendant groups have the same integers l, m and n when they are derived from the same fluoroolefin monomer, whereas they have different integers l, m and n when they are derived from different fluoroolefin monomers, as in the case of a copolymer prepared by copolymerizing at least two fluoroolefin monomers having different l, m and n with a main chain-forming perfluorocarbon monomer.

In the quaternary ammonium type anion exchanger of the present invention, the main chain is preferably a linear perfluorocarbon random polymer chain which comprises repeating units represented by the formula:

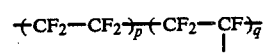

where p is an integer of 3 to 16, q is an integer of 1 to 10, and the ratio of p'/q' is within a range of from 2 to 16 where p' is an average value of all p in the repeating units and q' is an average value of all q in the repeating units.

Accordingly, a preferred quaternary ammonium type anion exchanger of the present invention is composed of a polymer comprises repeating units represented by the formula:

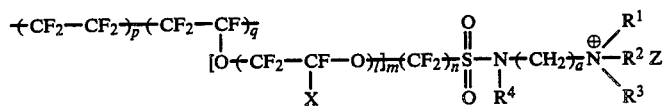

where p, q, X, l, m, n and a are as defined above and each of $R^1$ and $R^2$ is a lower alkyl group such as methyl, ethyl, n- or i-propyl, or n-, ,i-, s- or t-butyl; an aromatic group such as phenyl, tolyl, p-chlorophenyl, p-methoxyphenyl, furyl or thienyl; or a hydroxy-lower alkyl group such as 2-hydroxyethyl, 2-hydroxy-n-propyl or 3-hydroxy-n-propyl; or $R^1$ and $R^2$ together form a tetramethylene or pentamethylene group; $R^3$ is a lower alkyl group such as methyl, ethyl, n- or i-propyl, or n-, i-, s- or t-butyl, which is derived from an alkylating agent mentioned hereinafter; R⁴ is a hydrogen atom, a lower alkyl group such as methyl, ethyl, n- or i-propyl, or n-, i-, s- or t-butyl; or an alkyl group containing quaternary ammonium group(s) as mentioned above and Z is a counter ion for the quaternary ammonium ion, e.g. an anion of a halogen atom such as bromine or iodine; a super strong acid ion such as tetrafluoroboric acid ion, hexachloroantimonic acid ion or a trifluoromethanesulfonic acid ion; a sulfonic acid ion such as a benzenesulfonic acid ion or a toluenesulfonic acid ion; a carboxylic acid ion such as an acetic acid ion; or a monoalkylsulfuric acid ion.

From the viewpoint of usefulness as the ion-exchanger, it is preferred that the pendant chain has a terminal group of the formulae:

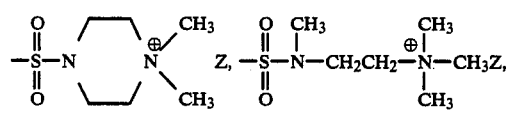

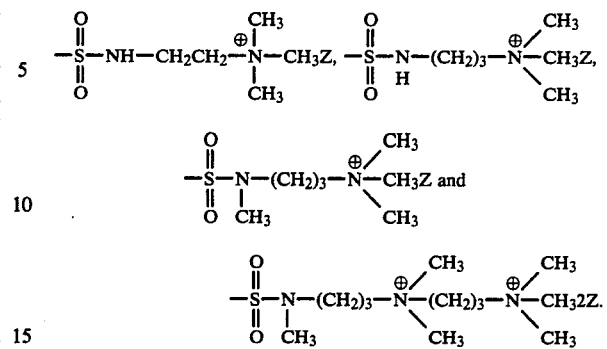

The quaternary ammonium type fluorocarbon polymer which composes the fluorocarbon anion exchanger of the present invention may have, for example, the following repeating units:

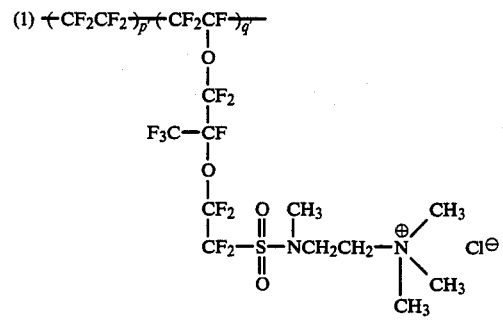

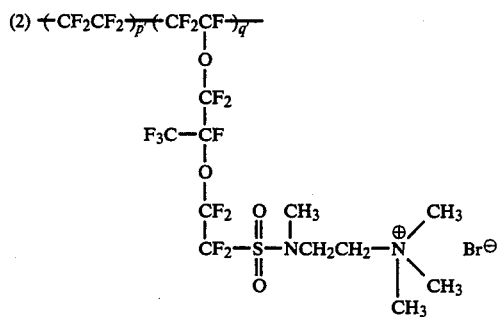

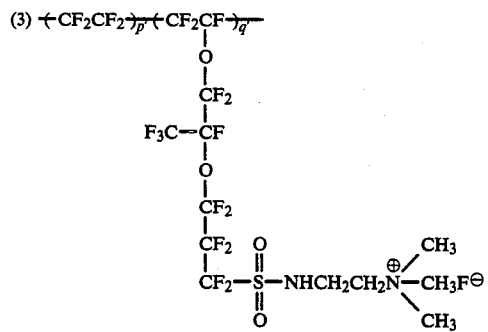

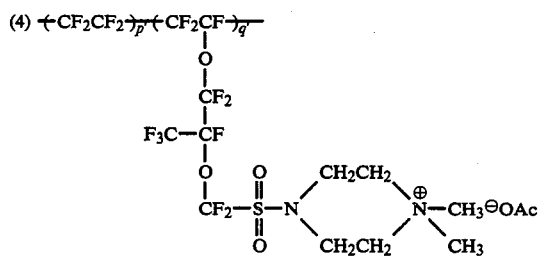

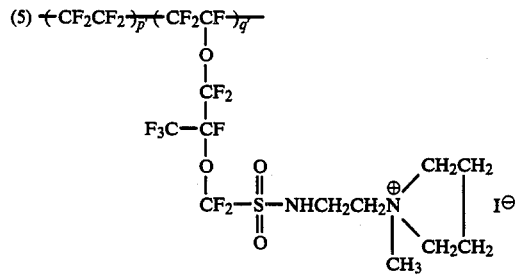

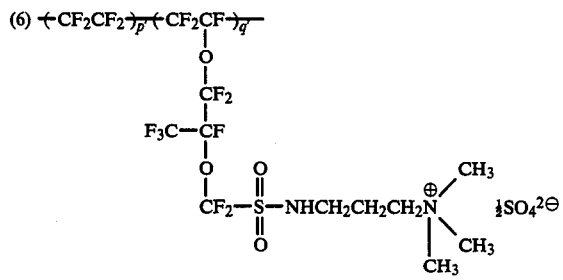

-continued
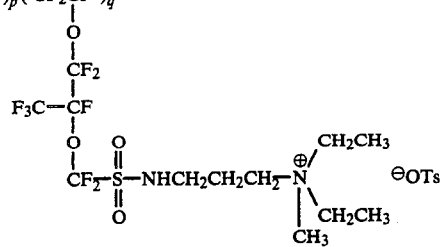
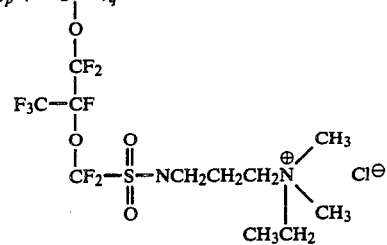
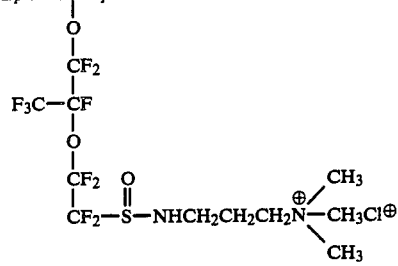
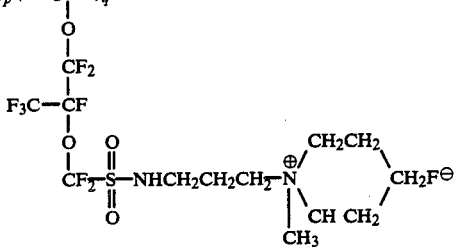
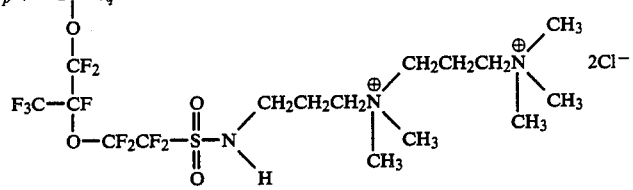
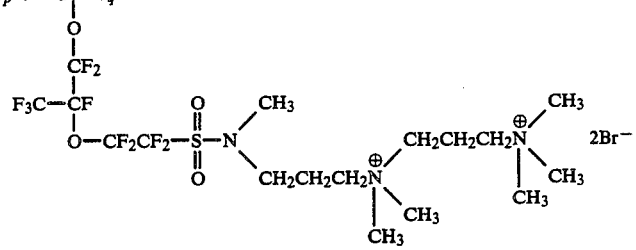
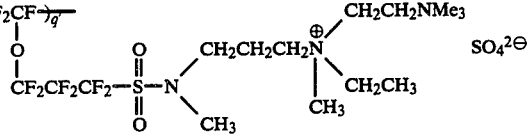
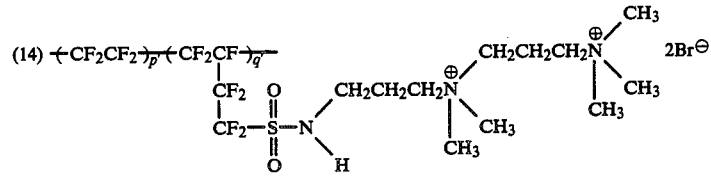
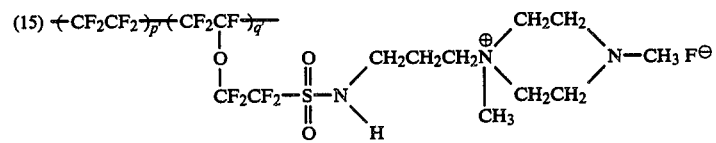

-continued

(16) 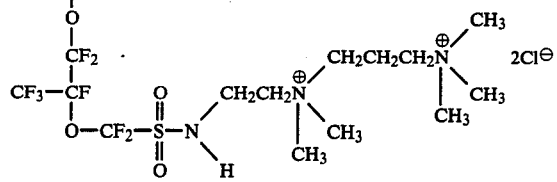

(17) 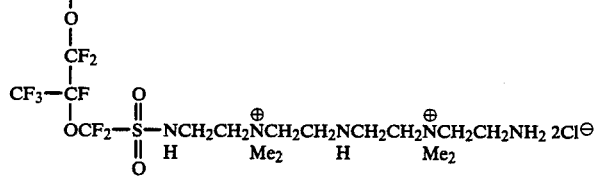

(18) 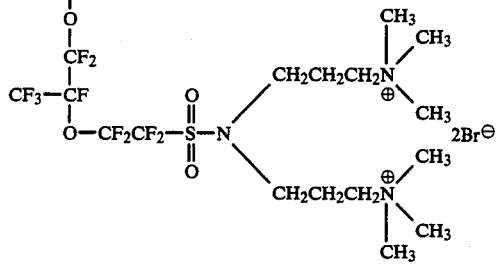

(19) 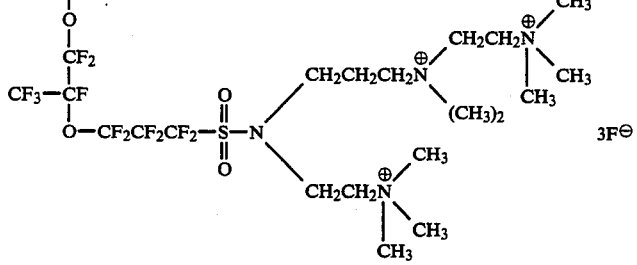

(20) 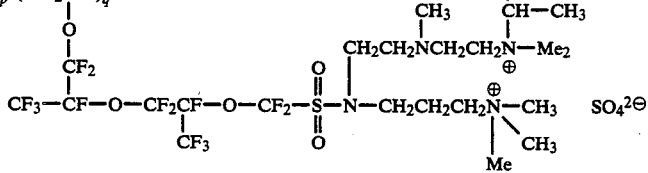

(21) 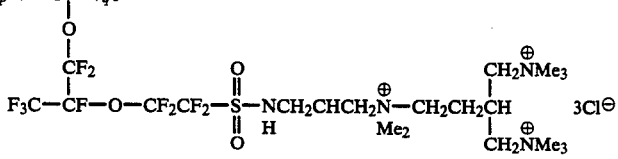

The quaternary ammonium type fluorocarbon polymer which composes the fluorocarbon anion exchanger of the present invention contains a hydrocarbon group as a part thereof. Nevertheless, it is extremely resistant to oxidation, particularly oxidation by chlorine, and durable against bases, as well as being resistant to solvents. Further, even when subjected to the repetition of the contraction by drying and the swelling in a solvent (inclusive of water), it undergoes no substantial property change, and its handling is very easy as compared with conventional anion exchangers. For instance, in the form of a membrane, the quaternary ammonium type polymer of the present invention is useful for applications for which conventional anion exchange membranes are hardly useful, e.g. as a diaphragm for an organic electrolytic reaction, or as a membrane for various dialyses conducted under severe conditions. It is useful in various forms as a resin which is capable of performing anion exchange with the quaternary ammonium ions in the presence of various solvents. Furthermore, it is useful as a catalyst for various reactions, for instance, as a catalyst for the synthesis of cyanohydrin, as an phase transfer catalyst, or as a halogenation reaction catalyst.

Further, in a tubular form, the anion exchange of the present invention may be employed as a multi-tube module in a space-saving dialysis apparatus. It is useful also for an undesirable anion removal system in an ion chromatography.

The anion exchange membrane of the present invention may have a greater number of ion exchange groups per a pendant group than the membrane from which it is prepared, which results in a lower membrane electric resistance, thus providing an additional advantage that it gives a low cell voltage, when used for electrolysis.

Thus, the quaternary ammonium type fluorocarbon anion exchanger of the present invention has a significant industrial value by virtue of the superior durability, etc.

The quaternary ammonium type polymer which composes the fluorocarbon anion exchanger can be prepared by a process which comprises reacting a sulfonamide group-containing fluorocarbon polyemr comprising a perfluorocarbon main chain and a pendant chain attached to the main chain and having a terminal group represented by the formula:

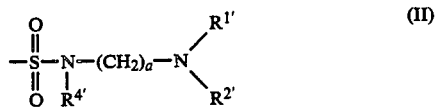
(II)

(where each of $R^{1'}$ is a hydrogen atom, a lower alkyl group, an aromatic group or an alkyl group containing amino group(s), $R^{2'}$ is a hydrogen atom, a lower alkyl group, an aromatic group or a hydroxy-lower alkyl group, or $R^{1'}$ and $R^{2'}$ together form a tetramethylene of pentamethylene group, $R^{4'}$ is a hydrogen atom, a lower alkyl group or an alkyl group cotnaining amino group(s), a is an integer of 2 to 5), with an alkylating agent to convert the terminal group of the formula II to the terminal group of the formula I.

As the alkylating agent, there may be mentioned a lower alkyl iodide or bromide, an ester of a strong acid, or a tri lower alkyl oxonium salt of a super acid, such as methyl iodide, ethyl bromide, n-propyl bromide, n-butyl iodide, trimethyloxonium tetrafluoroborate ($(CH_3)_3OBF_4$), triethyloxonium tetrafluoroborate ($(C_2H_5)_3OBF_4$), trimethyloxonium hexachloroantimonate ($(CH_3)_3OSbCl_6$), dimethyl sulfate, methyl trifluoroacetate, methyl trifluoromethanesulfonate, methyl p-toluenesulfonate or ethyl p-nitrobenzenesulfonate.

For the alkylation, there may be employed a solvent such as methanol, ethanol, methylene chloride, chloroform, carbon tetrachloride, tetrahydrofuran, sulforane, N,N-dimethylformamide (DMF), nitromethane or N-methyl-2-pyrrolidone (NMP).

The alkylation can be conducted under conditions which are commonly employed in alkylation of this type. For instance, it can readily be carried out by contacting the sulfonamide group-containing fluorocarbon polymer as the starting material, with the alkylating agent or its solution at a temperature of from about 0° to about 100° C.

The alkylating agent is used in an amount of at least a stoichiometric amount, preferably at least twice the stoichiometric amount, relative to the amino group to be converted to the quaternary ammonium group. In order to let the reaction proceed quickly and completely, it is common to employ the alkylating agent in a large excess amount.

When a solvent is employed, it is advisable to use it in a sufficient amount so that the fluorocarbon polymer is adequately immersed therein.

The alkylation reaction may vary depending upon species of the alkylating agent used, and the reaction condition such as temperature, solvent, etc., but it may usually be conducted under the above-mentioned conditions for about 10 hours to about 5 days.

Z in the formula I is a counter ion for the quaternary ammonium ion, which is usually derived also from the alkylating agent. As such a counter ion, there may be mentioned an anion of a halogen atom, such as bromine or iodine, a super strong acid ion such as a tetrafluoroboric acid ion, a hexachloroantimonic acid ion or a trifluoromethanesulfonic acid ion, a sulfonic acid ion such as a benzenesulfonic acid ion or a toluenesulfonic acid ion, a carboxylic acid ion such as an acetic acid ion, or a monoalkylsulfuric acid ion. These counter ions may be substituted by other ions, as the case requires. The substitution of ions can readily be made by a conventional method, for example, by treating the quaternary ammonium type fluorocarbon polymer obtained by the process of the present invention, with an alkali metal salt such as NaCl, LiCl, LiBr, LiI, NaOH, KOH, $NaNO_3$ or $K_2SO_4$.

The starting fluorocarbon polymer having terminal groups of the formula II may be used in any desired form such as in a flat membrane form, a tubular form, a fiber form or a powder form, whereby the final quaternary ammonium type polymer is obtainable in the corresponding form. Thus, an anion exchanger of the quaternary ammonium type polymer may be obtained in any desired form by so selecting the form of the starting material.

The sulfonamide group-containing fluorocarbon polyemr having terminal groups of the formula II can be prepared by a process which comprises reacting a fluorocarbon polymer comprising a perfluorocarbon main chain and having a fluorosulfonyl terminal group with an amine represented by the formula:

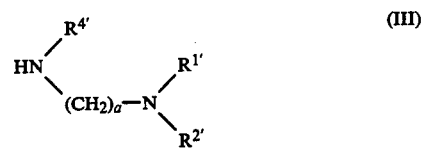
(III)

where $R^{1'}$, $R^{2'}$, $R^{4'}$ and a are as defined above, to convert the halosulfonyl terminal group to the terminal group of the formula II.

The fluorocarbon polymer having fluorosulfonyl terminal groups used as the starting material preferably has pendant chains represented by the formula:

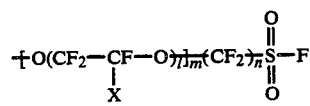

where X, l, m and n are as defined above.

A typical main chain of the polymer is a linear perfluorocarbon random polymer chain which comprises repeating units represented by the formula:

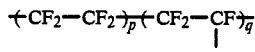

where p is an integer of 3 to 15, and q is an integer of 1 to 10.

Accordingly, a preferred polymer has repeating units represented by the formula:

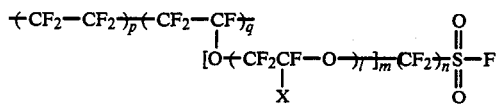

where X, l, m, n, p and q are as defined above.

As specified examples of the fluorocarbon polymer having fluorosulfonyl terminal groups, there may be mentioned those having the following repeating units:

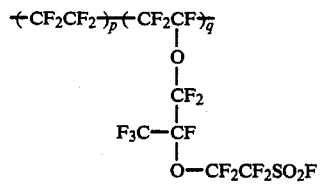
(1)

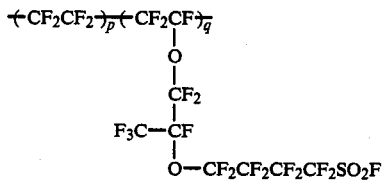
(2)

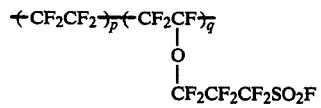
(3)

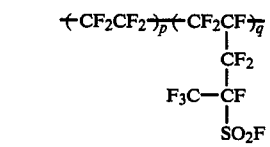
(4)

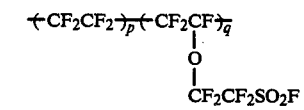
(5)

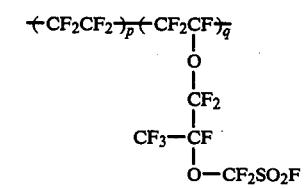
(6)

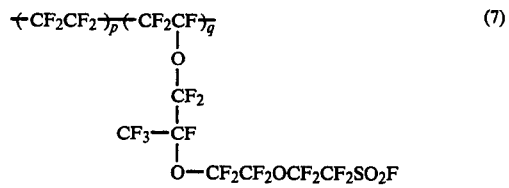
(7)

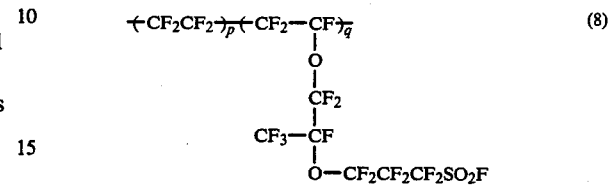
(8)

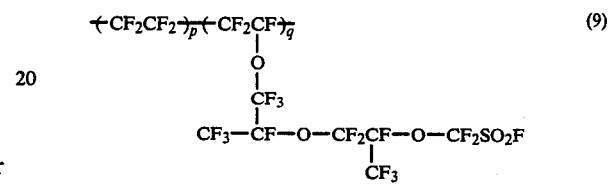
(9)

These fluorocarbon polymers are well known as precursors of sulfonic acid type cation exchange perfluorocarbon polymers (particularly as cation exchange membranes for the electrolysis of sodium chloride).

As the amine of the formula III to be used for the above reaction, there may be mentioned methylamine, N,N-dimethyl-1,3-propanediamine, N,N-diethyl-1,3-propanediamine, N-ethyl-N-methyl-1,3-propanediamine, N-isobutyl-N-methyl-1,3-propanediamine, N,N,N-trimethyl-1,3-propanediamine, N,N-dimethyl-N'-propyl-1,3-propanediamine, N-(3-aminopropyl)-2-pipecoline, 3-pyrrolidinopropylamine, 3-piperidinopropylamine, N,N-dimethyl-1,4-butanediamine, diethylenetriamine, triethylenetetramine, tetraethylenepentamine, N,N-dimethyldiethylenetriamine, di(trimethylene)triamine, N,N-dimethyl-di(trimethylene)triamine, N,N,N',N'-tetramethyl-di(trimethylene)triamine, N-ethyl-N-methyl-di(trimethylene)triamine, N,N-dimethyltri(trimethylene)tetramine, N-(N',N'-dimethylaminopropyl)ethylenediamine, N-(aminoethyl)piperazine, N-(aminopropyl)-N'-methylpiperazine, N,N-bis(dimethylaminoethyl)-1,4-phenylenediamine, N-pyrrolidinoethyltriethylenetetramine, N-[3,3-bis(N',N'-dimethylaminomethyl)propyl]propanediamine, or N,N-dimethyl-1,5-pentanediamine. Instead of these amines, the corresponding silyl amines obtained by substituting the hydrogen atoms on the nitrogen atoms of the amine of the formula V by a trimethylsilyl group, may also be used.

The reaction with the amine may be conducted in a liquid amine or by means of a solvent.

The amine is used in an amount of at least a stoichiometric amount, preferably at least three times the stoichiometric amount, more preferably in a great excess, relative to the starting material. The reaction may be conducted in the presence of a tertiary amine.

As the solvent, there may be employed an ether such as diethyl ether, tetrahydrofuran dimethoxyethane or dioxane; a hydrocarbon such as benzene, toluene or hexane; acetonitrile; or dimethylsulfoxide.

The solvent is used in a sufficient amount so that the fluorocarbon polymer having the fluorosulfonyl groups is adequately immersed therein. It may be used in an excess amount.

The reaction temperature is not critical. However, it is common to conduct the reaction at a temperature of from about −30° C. to about 150° C., preferably from about 0° C. to 80° C.

Now, the present invention will be described in further detail with reference to Examples and Reference Example. The term "an sulfonamide-type polymer" is meant for a sulfonamide group-containing fluorocarbon polymer. Further, the term "a terminal group" used here is meant for a terminal group of the pendant chain. The infrared absorption spectrum means a transmission spectrum unless otherwise specified. The dyeing test was conducted by using the following dye baths.

Crystal Violet: a 0.05% methanol solution of Crystal Violet
Cresol Red: a 0.05% methanol solution of Cresol Red
Thymol Blue: a 0.05% methanol solution of Thymol Blue
Bromothymol Blue: a 0.05% methanol solution of Bromothymol Blue
Basic Cresol Red: a solution obtained by adding about 1% of a 10% NaOH aqueous solution to a 0.05% water-methanol solution of Cresol Red
Basic Thymol Blue: a solution obtained by adding about 1% of a 10% NaOH aqueous solution to a 0.05% methanol solution of Thymol Blue Further, the electric resistance of a membrane was measured in a 0.5N NaCl aqueous solution at alternating current of 1000 cycles at a temperature of 25° C. after bringing the membrane to equilibrium in the 0.5N NaCl aqueous solution. The transport number of a membrane was calculated from the membrane potential generated between a 0.5 N NaCl aqueous solution and a 2.0 N NaCl aqueous solution, by means of a Nernst's equation.

The ion exchange capacity of an ammonium-type polymer was obtained by elemental analysis and subjecting an ammonium chloride type polymer to complete salt exchange and then quantitatively analyzing chlorine ions which were present in the polymer as counter ions, according to Vorhard method.

Further, the conversion was calculated from the nitrogen value obtained from the elemental analysis, taking into accounts of the change of the equivalent of weight due to the conversion of the terminal groups and taking the ion exchange capacity of the starting material copolymer as being 100%.

EXAMPLE 1

A copolymer film (film thickness: 100 μm; sulfonic acid-based ion-exchange capacity: 0.91 meq/g.dry film) was prepared by the copolymerization of $CF_2=CF_2$ with $CF_2=CFOCF_2CF(CF_3)OCF_2CF_2SO_2F$. This polymer membrane was composed mainly of repeating units having a structure of the formula (1'):

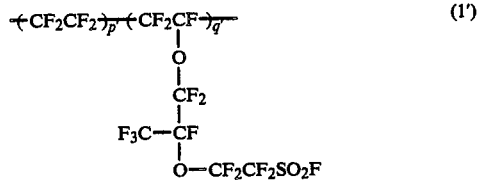

The ratio of p'/q' was about 6.5.

The polymer membrane thus obtained was treated with N,N-dimethyltrimethylenediamine in dry tetrahydrofuran at room temperature over night and at 50° C. for 20 hr. After washed with methanol, the membrane was dried under reduced pressure over night.

The absorption by C—H was observed at 2950–2800, 1450–1410 cm$^{-1}$. The conversion was ca. 86%.

The sulfonamide membrane thus obtained was treated with methyl iodide in methanol at 50° C. for 48 hr. The membrane obtained was washed with methanol and then treated with a methanol solution of lithium chloride at 50° C. for 24 hr. This membrane was washed with methanol at 50° C. for 8 hr. At IR spectra of the obtained membrane after drying, the absorption at 3000–2800 cm$^{-1}$ moved to higher wave number side with quaternization of the sulfonamide membrane.

In the dyeing test, the membrane thus obtained was dyed yellow with Cresol Red, dark orange with Thymol Blue, orange with Bromothymol Blue, red with basic Cresol Red, and blue with basic Bromothymol Blue.

This anion exchange membrane had an ion exchange capacity of 0.70 meq/g.dry membrane, an electric resistance of 4.1 Ωcm$^2$ and a transport number of 0.87.

This membrane was composed substantially of repeating units having a structure of the formula:

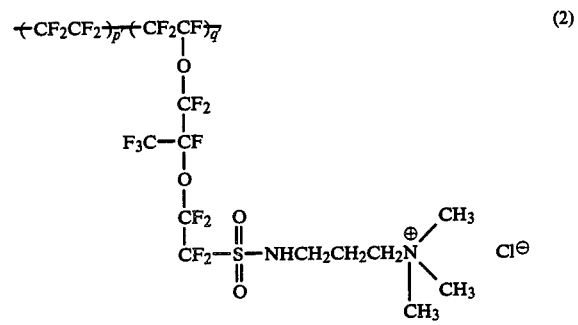

The ratio of p'/q' was about 6.5.

No change was observed in these values even after immersing the membrane in an aqueous solution saturated with chlorine at 60° C. for 200 hr. Likewise, no change was observed even when the membrane was treated in methanol at 65° C. for 48 hr, followed by the removal of the solvent under vacuum at 40° C., and this operation was repeated 5 times. Furthermore, no change was observed after immersing the membrane in an aqueous solution of 1N sodium hydroxide at 40° C. for 100 hr.

EXAMPLE 2

A copolymer film (film thickness: 125 μm; sulfonic acid-based ion-exchange capacity: 0.83 meq/g.dry film) was prepared by the copolymerization of $CF_2=CF_2$ with $CF_2=CFOCF_2CF(CF_3)OCF_2CF_2SO_2F$. This polymer membrane was composed mainly of repeating units having a structure of the formula (1) identified hereinafter. The ratio of p'/q' was about 7.6.

The polymer membrane thus obtained was treated with N,N-dimethyltrimethylenediamine in dry tetrahydrofuran at room temperature over night and at 60° C. for 25 hr. After washed with methanol, the membrane was dried under reduced pressure over night.

The absorption by C—H was observed at 2950–2800; 1460–1410 cm$^{-1}$. The conversion was ca. 84%.

The sulfonamide membrane thus obtained was treated with methyl iodide in N,N-dimethylformamide at 50° C. for 48 hr. The membrane obtained was washed with methanol and then treated with a methanol solution of lithium chloride at 50° C. for 8 hr. At IR spectra of the obtained membrane after drying, the absorption at 3000-2800 cm$^{-1}$ moved to higher wave number side with quaternization of the sulfonamide membrane.

In the dyeing test, the membrane thus obtained was dyed yellow with Cresol Red, orange with Bromothymol Blue, red with basic Cresol Red, and blue with basic Bromothymol Blue.

This anion exchange membrane had an ion exchange capacity of 0.62 meq/g.dry membrane, an electric resistance of 6.8 Ωcm$^2$ and a transport number of 0.88.

This membrane was composed substantially of repeating units having a structure of the formula:

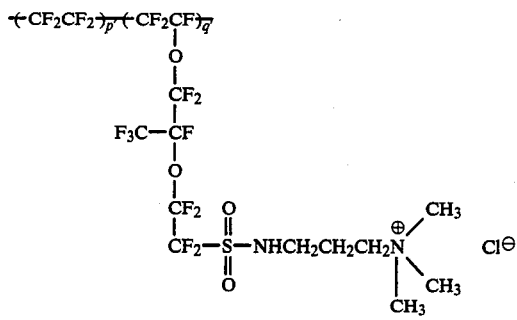

The ratio of p'/q' was about 7.6.

No change was observed in these values even after immersing the membrane in an aqueous solution saturated with chlorine at 60° C. for 200 hr. Likewise, no change was observed even when the membrane was treated in methanol at 65° C. for 48 hr, followed by the removal of the solvent under vacuum at 40° C., and this operation was repeated 5 times. Furthermore, no change was observed after immersing the membrane in an aqueous solution of 1N sodium hydroxide at 40° C. for 100 hr.

EXAMPLE 3

A copolymer film (film thickness: 125 μm; sulfonic acid-based ion-exchange capacity: 0.83 meq/g.dry film) was prepared by the copolymerization of $CF_2=CF_2$ with $CF_2=CFOCF_2CF(CF_3)OCF_2CF_2SO_2F$. This polymer membrane was composed mainly of repeating units having a structure of the formula (1) identified hereinafter. The ratio of p'/q' was about 7.6.

The polymer membrane thus obtained was treated with N,N-dimethyl-di(trimethylene)triamine in dry tetrahydrofuran at room temperature over night and at 60° C. for 30 hr. After washed with methanol, the membrane was dried under reduced pressure over night.

The absorption by C—H was observed at 2970-2800, 1460-1400 cm$^{-1}$. The conversion was ca. 76%.

The sulfonamide membrane thus obtained was treated with methyl iodide in methanol at 50° C. for 48 hr. The membrane obtained was washed with methanol and then trated with a methanol solution of lithium chloride at 50° C. for 24 hr. This membrane was washed with methanol at 50° C. for 8 hr. At IR spectra of the obained membrane after drying, the absorption at 3000-2800 cm$^{-1}$ moved to higher wave number side with quaternization of the sulfonamide membrane.

In the dyeing test, the membrane thus obtrained was dyed yellow with Cresol Red, orange with Thymol Blue, orange with Bromothymol Blue, red with basic Cresol Red, dark blue with basic Thymol Blue, and blue with basic Bromothymol Blue.

This anion exchange membrane had an ion exchange capacity of 1.0 meq/g.dry membrane, an electric resistance of 2.4 Ωcm$^2$ and a transport number of 0.86.

This membrane was composed substantially of repeating units having a structure of the formula:

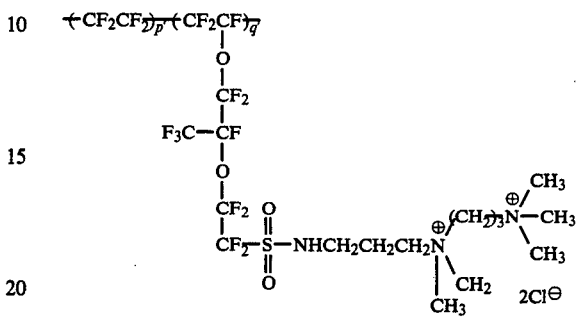

The ratio of p'/q' was about 7.6.

No change was observed in these values even after immersing the membrane in an aqueous solution saturated with chlorine at 60° C. for 200 hr. Likewise, no change was observed even when the membrane was treated in methanol at 65° C. for 48 hr, followed by the removal of the solvent under vacuum at 40° C., and this operation was repeated 5 times. Furthermore, no change was observed after immersing the membrane in an aqueous solution of 1N sodium hydroxide at 40° C. for 100 hr.

EXAMPLE 4

A copolymer film (film thickness: 125 μm; sulfonic acid-based ion-exchange capacity: 0.83 meq/g.dry film) was prepared by the copolymerization of $CF_2=CF_2$ with $CF_2=CFOCF_2CF(CF_3)OCF_2CF_2SO_2F$. This polymer membrane was composed mainly of repeating units having a structure of the formula (1) identified hereinafter. The ratio of p'/q' was about 7.6.

The polymer membrane thus obtained was treated with N,N,N'-trimethyl-trimethylenediamine in dry toluene at room temperature over night and at 80° C. for 40 hr. After washed with methanol, the membrane was dried under reduced pressure over night.

The absorption by C—H was observed at 2960-2800, 1460-1400 cm$^{-1}$. The conversion was ca. 72%.

The sulfonamide membrane thus obtained was treated with methyl iodide in methanol at 50° C. for 48 hr. The membrane obtained was washed with methanol and then trated with a methanol solution of lithium chloride at 50° C. for 24 hr. This membrane was washed with methanol at 50° C. for 8 hr. At IR spectra of the obained membrane after drying, the absorption at 3000-2800 cm$^{-1}$ moved to higher wave number side with quaternization of the sulfonamide membrane.

In the dyeing test, the membrane thus obtrained was dyed yellow with Cresol Red, pale orange with Bromothymol Blue, pale red with basic Cresol Red, and pale blue with basic Bromothymol Blue.

This anion exchange membrane had an ion exchange capacity of 0.57 meq/g.dry membrane, an electric resistance of 8.8 Ωcm$^2$ and a transport number of 0.88.

This membrane was composed substantially of repeating units having a structure of the formula:

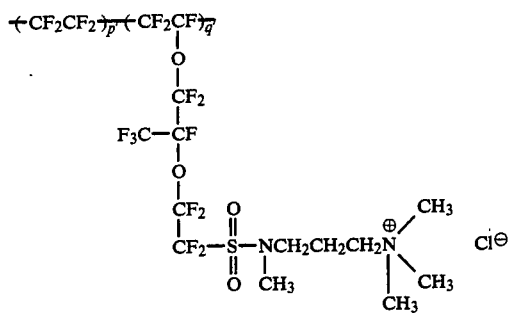

The ratio of p'/q' was about 7.6.

No change was observed in these values even after immersing the membrane in an aqueous solution saturated with chlorine at 60° C. for 200 hr. Likewise, no change was observed even when the membrane was treated in methanol at 65° C. for 48 hr, followed by the removal of the solvent under vacuum at 40° C., and this operation was repeated 5 times. Furthermore, no change was observed after immersing the membrane in an aqueous solution of 1N sodium hydroxide at 40° C. for 100 hr.

EXAMPLE 5

A copolymer film (film thickness: 100 μm; sulfonic acid-based ion-exchange capacity: 0.9 meq/g.dry film) was prepared by the copolymerization of $CF_2=CF_2$ with $CF_2=CFOCF_2CF(CF_3)OCF_2CF_2SO_2F$. This polymer membrane was composed mainly of repeating units having a structure of the formula (1) identified hereinafter. The ratio of p'/q' was about 6.4.

The polymer membrane thus obtained was treated with N-methylpiperazine in dry diethyl ether at room temperature over night and at 50° C. for 5 hr. After washed with methanol, aq. sodium bicarbonate, and warm water, the membrane was dried under reduced pressure over night.

The absorption by C—H was observed at 2930, 2850, 1450–1430 cm$^{-1}$. The conversion was ca. 89%.

The sulfonamide membrane thus obtained was treated with methyl iodide in methanol at 50° C. for 48 hr. The membrane obtained was washed with methanol and then treated with a methanol solution of lithium chloride at 50° C. for 24 hr. This membrane was washed with methanol at 50° C. for 8 hr. At IR spectra of the obtained membrane after drying, the absorption at 3000–2800 cm$^{-1}$ moved to higher wave number side with quaternization of the sulfonamide membrane.

In the dyeing test, the membrane thus obtained was dyed pale yellow with Cresol Red, pale orange with Bromothymol Blue, pale red with basic Cresol Red, and pale blue with basic Bromothymol Blue.

This anion exchange membrane had an ion exchange capacity of 0.73 meq/g.dry membrane, an electric resistance of 3.2 Ωcm$^2$ and a transport number of 0.86.

This membrane was composed substantially of repeating units having a structure of the formula:

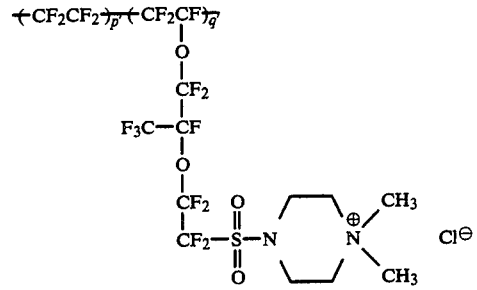

The ratio of p'/q' was about 6.4.

No change was observed in these values even after immersing the membrane in an aqueous solution saturated with chlorine at 60° C. for 200 hr. Likewise, no change was observed even when the membrane was treated in methanol at 65° C. for 48 hr, followed by the removal of the solvent under vacuum at 40° C., and this operation was repeated 5 times. Furthermore, no change was observed after immersing the membrane in an aqueous solution of 1N sodium hydroxide at 40° C. for 100 hr.

EXAMPLE 6

A copolymer film (film thickness: 100 μm; sulfonic acid-based ion-exchange capacity: 0.9 meq/g.dry film) was prepared by the copolymerization of $CF_2=CF_2$ with $CF_2=CFOCF_2CF(CF_3)OCF_2CF_2SO_2F$. This polymer membrane was composed mainly of repeating units having a structure of the formula (1) identified hereinafter. The ratio of p'/q' was about 6.4.

The polymer membrane thus obtained was treated with N,N,N'-trimethylethylenediamine in dry diethyl ether at room temperature over night and at 50° C. for 5 hr. After washed with methanol, aq. sodium bicarbonate, and warm water, the membrane was dried under reduced pressure over night.

The absorption by C—H was observed at 3000, 2930, 2850 cm$^{-1}$. The conversion was ca. 87%.

The sulfonamide membrane thus obtained was treated with methyl iodide in methanol at 50° C. for 48 hr. The membrane obtained was washed with methanol and then treated with a methanol solution of lithium chloride at 50° C. for 24 hr. This membrane was washed with methanol at 50° C. for 8 hr. At IR spectra of the obtained membrane after drying, the absorption at 3000–2800 cm$^{-1}$ moved to higher wave number side with quaternization of the sulfonamide membrane.

In the dyeing test, the membrane thus obtained was dyed pale yellow with Cresol Red, pale orange with Bromothymol Blue, pale red with basic Cresol Red, and pale blue with basic Bromothymol Blue.

This anion exchange membrane had an ion exchange capacity of 0.71 meq/g.dry membrane, an electric resistance of 3.5 Ωcm$^2$ and a transport number of 0.85.

This membrane was composed substantially of repeating units having a structure of the formula:

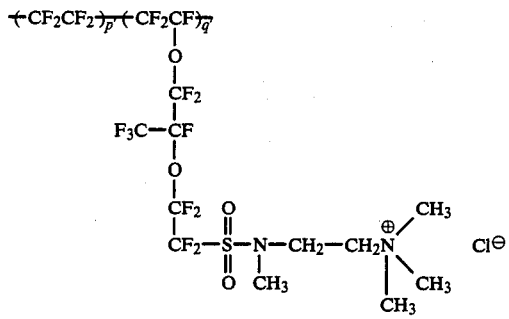

The ratio of p'/q' was about 6.4.

No change was observed in these values even after immersing the membrane in an aqueous solution saturated with chlorine at 60° C. for 200 hr. Likewise, no change was observed even when the membrane was treated in methanol at 65° C. for 48 hr, followed by the removal of the solvent under vacuum at 40° C., and this operation was repeated 5 times. Furthermore, no change was observed after immersing the membrane in an aqueous solution of 1N sodium hydroxide at 40° C. for 100 hr.

EXAMPLE 7

A copolymer obtained by copolymerizing $CF_2=CF_2$ with

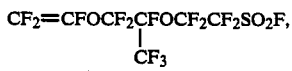

was formed into a tube (internal diameter: 0.625 mm; outer diameter: 0.875 mm; $SO_3H$-based ion exchange capacity: 0.92 meq/g.dry tube). This polymer membrane was composed mainly of repeating units having a structure of the formula (1) identified hereinafter. The ratio of p'/q' was about 6.4.

The polymer membrane thus obtained was treated with N,N-dimethyltrimethylenediamine in dry tetrahydrofuran at room temperature over night and at 60° C. for 26 hr. After washed with methanol, the membrane was dried under reduced pressure over night. The absorption by C—H was observed at 2950–2800, 1460–1410 cm$^{-1}$. The conversion was ca. 80%.

The sulfonamide tube thus obtained wa treated with methyl iodide in N,N-dimethylformamide at 50° C. for 48 hr. The tube obtained was washed with methanol and then treated with a methanol solution of lithium chloride at 50° C. for 24 hr. This tube was washed with methanol at 50° C. for 8 hr. At IR spectra of the obtained membrane after drying, the absorption at 3000–2800 cm$^{-1}$ moved to higher wave number side with quaternization of the above sulfonamide tube.

In the dyeing test, the tube thus obtained was dyed yellow with Cresol Red, pale orange with Bromothymol Blue, pale red with basic Cresol Red, and pale blue with basic Bromothymol Blue.

This anion exchange membrane had an ion exchange capacity of 0.68 meq/g.dry tube.

This membrane was composed substantially of repeating units having a structure of the formula:

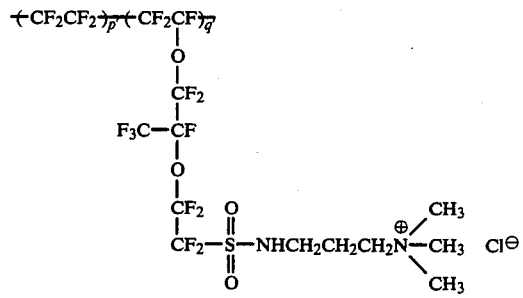

The ratio of p'/q' was about 6.4.

This tube showed a similar durability as the membrane obtained in Example 1.

EXAMPLE 8

A copolymer powder (sulfonic acid-based ion-exchange capacity: 0.91 meq/g.dry film) was prepared by the copolymerization of $CF_2=CF_2$ with $CF_2=CFOCF_2CF(CF_3)OCF_2CF_2SO_2F$. This polymer membrane was composed mainly of repeating units having a structure of the formula (1) identified hereinafter. The ratio of p'/q' was about 6.5.

The polymer membrane thus obtained was treated with N,N-dimethyltrimethylenediamine in dry tetrahydrofuran at room temperature over night and at 60° C. for 30 hr. After washed with methanol, the membrane was dried under reduced pressure over night.

The absorption by C—H was observed at 2960–2800, 1460–1400 cm$^{-1}$. The conversion was 77%.

The sulfonamide powder thus obtained was treated with methyl iodide in N,N-dimethylformamide at 50° C. for 48 hr. The powder obtained was washed with methanol and then treated with a methanol solution of lithium chloride at 50° C. for 24 hr. This powder was washed with methanol at 50° C. for 8 hr. At IR spectra of the obtained powder after drying, the absorption at 3000–2800 cm$^{-1}$ moved to higher wave number side with quaternization of the above sulfonamide powder.

In the dyeing test, the powder thus obtained was dyed pale yellow with Cresol Red, pale orange with Bromothymol Blue, pale red with basic Cresol Red, and pale blue with basic Bromothymol Blue.

This anion exchange membrane had an ion exchange capacity of 0.66 meq/g.dry resin.

This membrane was composed substantially of repeating units having a structure of the formula:

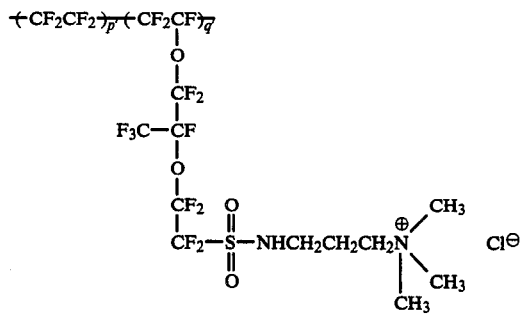

The ratio of p'/q' was about 6.5.

This powder showed a similar durability as the membrane obtained in Example 1.

REFERENCE EXAMPLE

The membranes obtained in Examples 1 and 3 were used for the electrolysis of hydrochloric acid, and the results obtained is shown in Table 1. As a Comparative Example, the electrolysis was conducted in the same manner except that instead of this membrane, a commercially available hydrocarbon type anion exchange membrane was used, and the results thereby obtained are also shown in Table 1. The electrolysis was conducted under the following conditions.

Membrane Surface area: 9.6 cm$^2$
Electrodes: Platinum
Electrolytes: Anode/Cathode=6N hydrochloric acid/6N hydrochloric acid
Temperature: room temperature

TABLE 1

| Membrane | Electric resistance (Ω · cm) | Cell voltage (V) |
|---|---|---|
| Example 1 | 4.1 | 1.54 |
| Example 3 | 2.4 | 1.45 |
| Commercial one | ca. 2.5 | 1.49 |

We claim:

1. A fluorocarbon anion exchanger which is composed of a fluorocarbon polymer comprising a perfluorocarbon main chain and a pendant chain attached to the main chain, characterized in that the pendant chain has a terminal group represented by the formula:

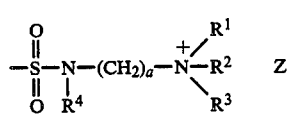

(I)

where R$^1$ is a lower alkyl group, an aromatic group or an alkyl group containing quaternary ammonium group(s), R$^2$ is a lower alkyl group, an aromatic group or a hydroxy-lower alkyl group, or R$^1$ and R$^2$ together form a tetramethylene or pentamethylene group, R$^3$ is a lower alkyl group, R$^4$ is a hydrogen atom, a lower alkyl group or an alkyl group containing quaternary ammonium group(s), a is an integer of 2 to 5, and Z is a counter ion for the quaternary ammonium ion.

2. The fluorocarbon anion exchanger according to claim 1, wherein the pendant chain has a structure represented by the formula:

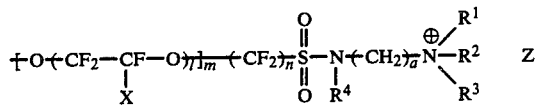

where X is a fluorine atom, a chlorine atom or a —CF$_3$ group, l is an integer of 0 to 5, m is 0 or 1, n is an integer of 1 to 5, and, R$^1$, R$^2$, R$^3$, R$^4$, a and Z are as defined in claim 1.

3. The fluorocarbon anion exchanger according to claim 1, wherein the main chain is a linear perfluorocarbon random polymer chain comprising repeating units represented by the formula:

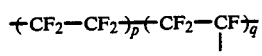

where p is an integer of 3 to 16, q is an integer of 1 to 10, and the ratio of p'/q' is within a range of from 2 to 16 where p' is an average value of all p in the repeating units and q' is an average value of all q in the repeating units.

4. The fluorocarbon anion exchanger according to claim 1, which is composed of the fluorocarbon polymer comprises repeating units represented by the formula:

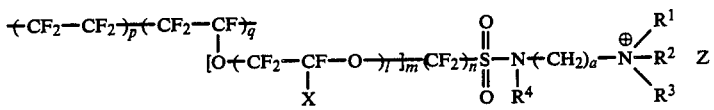

where p is an integer of 3 to 16, q is an integer of 1 to 10, and the ratio of p'/q' is within a range of from 2 to 16 where p' is an average value of all p in the repeating untis and q' is an average value of all q in the repeating untis, X is a fluorine atom, a chlorine atom or a —CF$_3$ group, l is an integer of 0 to 5, m is 0 or 1, n is an integer of 1 to 5, and R$^1$, R$^2$, R$^3$, R$^4$, a and Z are as defined in claim 1.

5. The fluorocarbon anion exchanger according to claim 1, wherein the pendant chain has a terminal group selected from the group consisting of

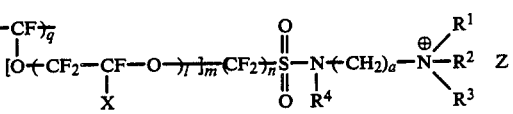

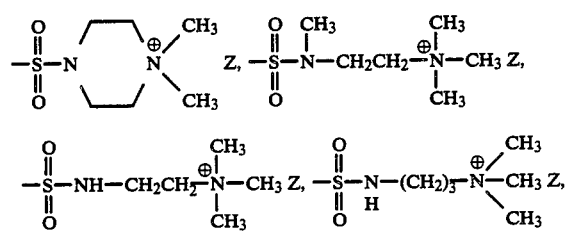

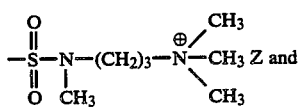

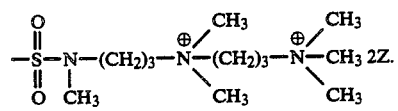

* * * * *